United States Patent
Moeglich

[15] 3,637,979
[45] Jan. 25, 1972

[54] EDUCATIONAL APPARATUS

[72] Inventor: Karl Moeglich, Deerfield Beach, Fla.
[73] Assignee: Automatic Sprinkler Corporation of America, Cleveland, Ohio
[22] Filed: Jan. 16, 1969
[21] Appl. No.: 791,571

[52] U.S. Cl. ............................ 219/271, 219/314, 219/312
[51] Int. Cl. ........................................................ F22b 1/28
[58] Field of Search ........................... 219/271–275, 282, 219/297, 298, 312–319, 320, 321, 330–335, 365, 341, 310; 122/451; 137/209, 588

[56] References Cited

UNITED STATES PATENTS

| | | | |
|---|---|---|---|
| 1,376,509 | 5/1921 | Borst, Jr. | 219/314 |
| 2,391,071 | 12/1945 | Price | 219/38 |
| 3,222,498 | 12/1965 | Miksch et al. | 219/271 |
| 2,623,153 | 12/1952 | McGinnis | 219/332 X |
| 2,916,598 | 12/1959 | Hayden | 219/321 X |
| 3,031,559 | 4/1962 | Harmon et al. | 219/330 X |
| 3,272,965 | 9/1966 | Reichelt | 219/335 X |
| 3,385,318 | 5/1968 | Kilbourn | 137/588 X |
| 3,484,580 | 12/1969 | Morgan | 219/330 |

Primary Examiner—R. F. Staubly
Assistant Examiner—Gale R. Peterson
Attorney—Petherbridge, O'Neill & Aubel

[57] ABSTRACT

An educational phase heat exchanger, primarily a functional device, which is arranged as an educational aid. The apparatus consists of two major components: a boiler and a liquid-feed reservoir. Both of these components are ordinarily constructed of a corrosion-resistant material and can be used for the production of wet or dry steam and for the production of wet or super-heated vapors from primary alcohols or mixed liquids of various viscosities. By attaching thermocouples at predetermined points in the system, studies of heat transfer through component walls, enthalpies of vapors, heat balance of systems and other similar investigations can be conducted.

9 Claims, 3 Drawing Figures

INVENTOR.
KARL MOEGLICH

EDUCATIONAL APPARATUS

The teaching profession at all levels of instructions has long been confronted with the problem of the effective development of learning and creative thought processes of students. The lecture system of education, primarily involving the imposition of the knowledge of the instructor on the mind of the student, has been in favor in the teaching profession for many years. This conventional lecture approach involves several acknowledged shortcomings. First, each of the students in a lecture group is ordinarily carried at the instructional pace of the teacher with virtually no concessions being made for individual students who are unable to grasp the subject matter at the teacher's pace and with no inducements made for the more rapid advancement of individuals capable of digesting material at a more rapid rate. Second, the lecture system does little to encourage learning or learning how to learn by individuals in the group. The knowledge of the instructor is directed to the students as a group. This knowledge is imposed upon each student, absorbed or digested in part or fully by some and lost in full or in part by others. The long range result of the system is to essentially foster the mediocrity of an entire student group.

In the lecture or imposed knowledge approach to education, visual aids are frequently employed to demonstrate various phenomena. Visual aids may take the form of rudimentary devices or of highly sophisticated precision laboratory equipment. Presently, some schools have large permanent instructional installations for use in the presentation of educational demonstrations of the heat transfer characteristics of fluids. These installations ordinarily include expensive steam power plants which use valuable space, are permanent in nature, and usually require a relatively time-consuming startup period before an experiment or demonstration can be presented to a class. However, regardless of the type or form of the visual aid used in connection with lecture demonstrations, the individual student is only permitted to observe that which is demonstrated by the instructor. The student is effectively isolated from the visual aid and has virtually no opportunity to pursue personal inquiries relating to an understanding of that which is being demonstrated. The student is thereby isolated from the full development of his mental processes in relation to the visual aid before him.

The shortcomings of the conventional lecture system of education and the equipment used for demonstrative purposes under this educational approach have led applicant to the development of educational equipment which is designed not to serve primarily as a visual or teaching aid, but is designed to serve as a direct aid to learning.

The phase heat exchange apparatus or system of the invention is designed to assist students, individually, in the realization of the full potential of their learning capacities. The phase heat exchange system of the invention will serve to improve, simplify and accelerate the learning process of individual students in accordance with the ability of each such student to absorb the technology involved in heat transfer. The phase heat exchange apparatus will also enable a student to utilize to the fullest, his undirected creative talents and ingenuity in dealing with heat exchange and heat transfer phenomena and to apply the developed learning techniques in other fields of technology.

The apparatus embodying the educational phase heat exchange system of the invention is preferably compact and therefore portable and includes basic boiler and liquid-feed reservoir components. The liquid-feed reservoir or tank is preferably fabricated from a corrosion resistant material such as stainless steel and is designed to contain a predetermined quantity of a fluid which may comprise either a liquid or a vapor or combination of both. The liquid-feed reservoir is designed to be pressurized through a pneumatic-type valve mounted on the exterior of the tank forming the reservoir. A pressure indicator is attached to the tank and senses the internal fluid pressure thereof. A sight glass assembly is connected to the reservoir or tank to permit visual observation of the fluid level within the tank. The liquid-feed reservoir or tank is connected to the boiler component through a conduit. A manually operable valve is provided in this conduit to permit the selective control of fluid flow from the tank to the boiler. Pressurization of the tank, which can be accomplished utilizing an ordinary bicycle tire pump or similar pneumatic means, will provide a positive fluid feed to the boiler through the conduit as long as the pressure in the tank is maintained at a level above that of the boiler operating range.

The boiler of the phase heat exchange system of the invention is designed to be fast acting to virtually eliminate a prolonged preuse startup time and includes a first heating unit consisting of a plurality of sheathed heating elements in the first or lower zone of the boiler and an additional heating unit located in the upper or second zone of the boiler. The first and second zones are preferably separated by an ebullience suppressor formed of a plurality of layers of fine mesh screen to prevent the passage of droplets from the first to second zone. A fin arrangement designed to serve as a heat conductor is secured to the heating unit in the second zone in a spiral relationship therewith and serves to cooperate with the heating unit to produce the superheating of fluid passing into the second zone. A sight glass assembly is also connected to the boiler to enable the operator to observe the fluid level being maintained in the boiler. A fluid discharge is provided in the second zone and in some embodiments, a pressure relief valve may be used to prevent the development of fluid pressure overloads.

The boiler is provided with a pair of temperature gauges, one in the first zone and one in the second zone, to permit visual observation, on a continuous basis, of the operating temperatures being developed in each zone. Also, a pressure gauge is connected to the boiler to enable the user of a system to compare the pressure of the reservoir tank with that being developed in the boiler so that he can be sure to maintain a positive feed pressure in the liquid-feed reservoir during the operation of the system.

The heating elements of each of the heating units are cartridge types sheathed in stainless steel and are separately operable to permit the selective closing down of various elements and thereby the heat input into the system to permit a student to observe the results of the reduction or increase of heat input into either or both the first and second boiler zones.

By the attachment of thermocouples to various parts of the boiler system and wherein the phase heat exchange system is connected to an accurately controllable source of electric power, innumerable experiments can be conducted to illustrate the effects of heat transfer and loss through the metals comprising the boiler of the system, heat sink efficiencies, thermal conductivities, etc.

Various other objects and advantages will become more fully apparent from the following description and drawings illustrating the presently preferred embodiments thereof and wherein.

Figure 1:
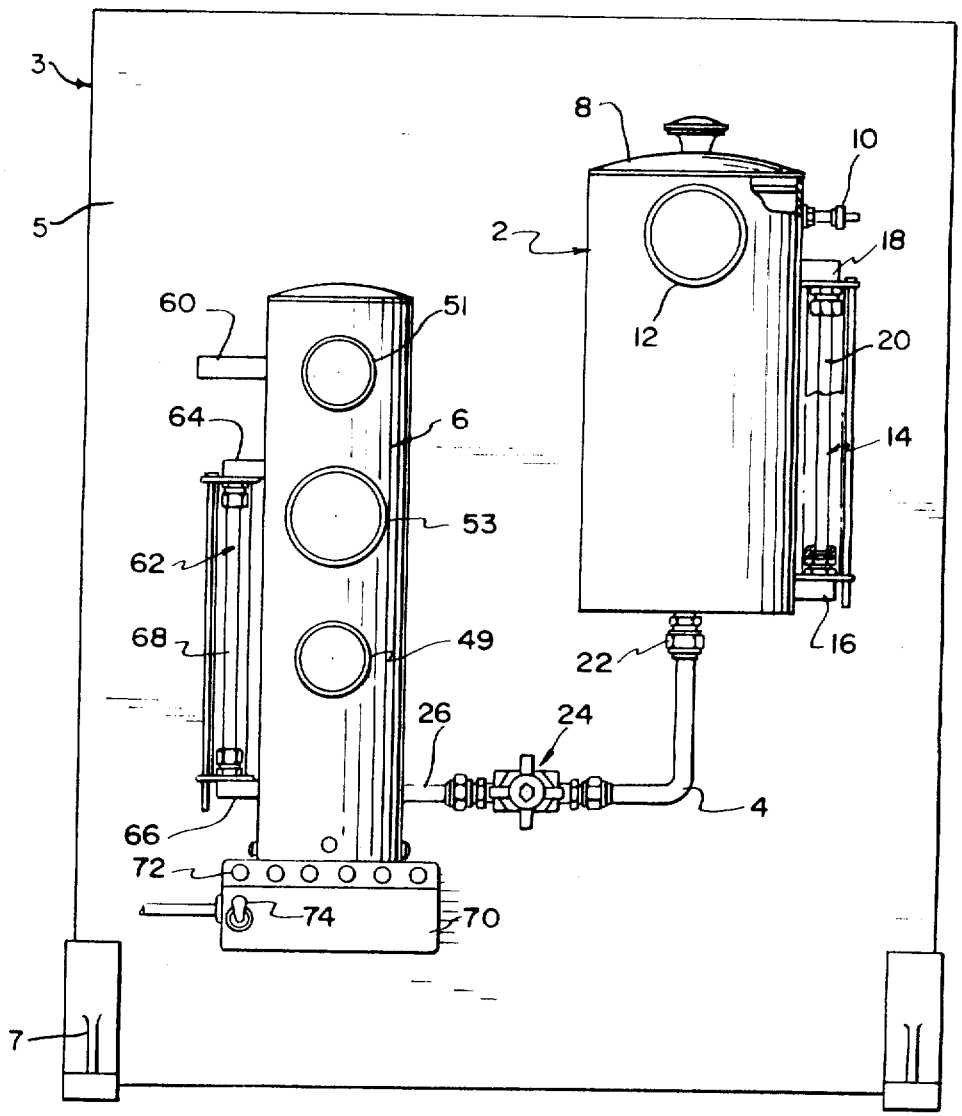
FIG. 1 is a front elevation of the phase heat exchange apparatus of the invention.

Referring now to FIG. 1, the basic elements of the electrical phase heat exchange apparatus of the invention include a fluid-feed reservoir or tank, generally designated 2, and a fluid conduit 4 connecting reservoir tank 2 with a boiler, generally designated 6. Reservoir 2 and boiler 8 are unitarily mounted on the front face of a frame 3 by means of conventional bracket 3' to permit the visual observation of the apparatus. The frame 3 includes a vertical extending flat portion 5 and a pair of legs 7 are attached to the bottom of the flat portion to provide balance to the frame and permit the boiler and reservoir to be moved as a unit.

The fluid-feed reservoir or tank 2 is preferably fabricated from a corrosion-resistant material, such as stainless steel, to permit its use in connection with a variety of corrosive fluids. The tank 2 is shown in FIG. 1 to be formed as a simple cylindrical container with a removable lid 8. The lid 8 is threaded into the upper open ended portion of tank 2 and provides a pressure seal of the tank. A valve 10 is secured to the exterior of tank 2 near the lid 8. This valve is preferably a pneumatic-tire-type valve which can be used to introduce a gas under pressure into the tank interior.

In the preferred embodiment of the invention, reservoir tank 2 can be pressurized through valve 10 by the use of a common tire pump. A pressure gauge or indicator 12 is connected to tank 2 in pressure communication with the interior thereof and is designed to reflect the operating pressure of the fluid contained in the tank in a manner which is readily visually observable.

A sight glass assembly, generally designated 14, is secured to the exterior of the tank 2 and is designed to provide a visually observable means for detecting the level of the fluid contents of tank 2. The sight glass assembly consists of a lower mounting member 16, an upper mounting member 18, a hollow glass tube 20 connected between the mounting members 16 and 18 and in communication with the interior of tank 2 through conduits in the upper and lower mounting members 16 and 18, respectively, (not shown) in a conventional manner.

As is best shown in FIG. 1, it can be seen that conduit 4 is connected in communication with the lower portion of fluid feed reservoir tank 2 through a junction 22. A common manually operable needle valve assembly, generally designated 24, is connected in communication with conduit 4 and through tube 26 is connected to the lower portion of the boiler 6. As in the case of the fluid-feed reservoir or tank 2 and its components, the conduit and valve assembly interconnecting tank 2 and boiler 6 are preferably fabricated from corrosion-resistant materials, such as stainless steel.

Figure 2:
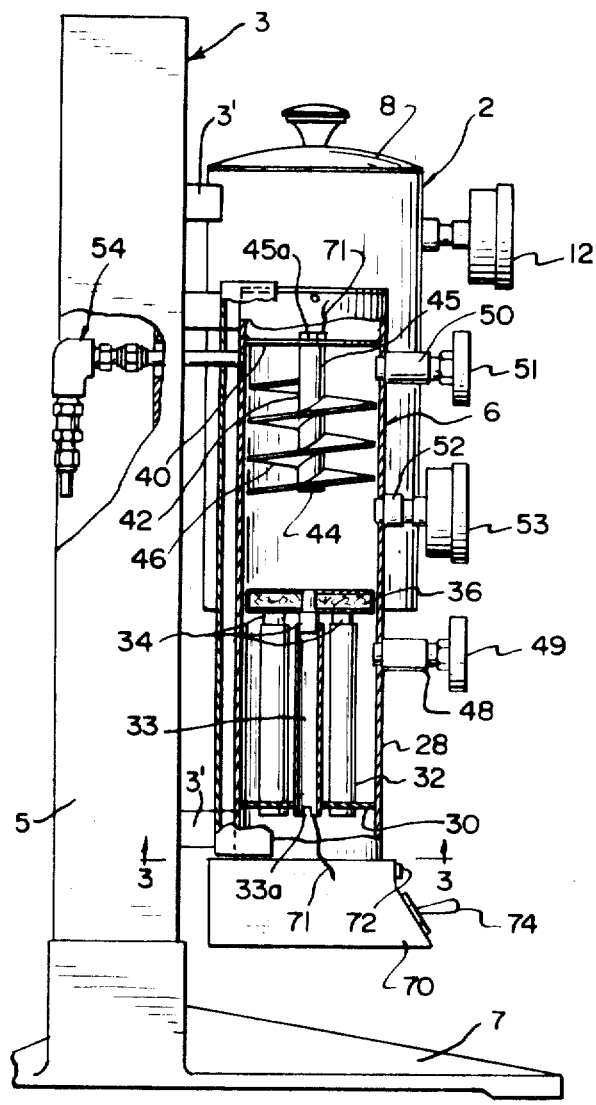
FIG. 2 is a side elevation with parts broken away of the boiler illustrated in FIG. 1.
Figure 3:
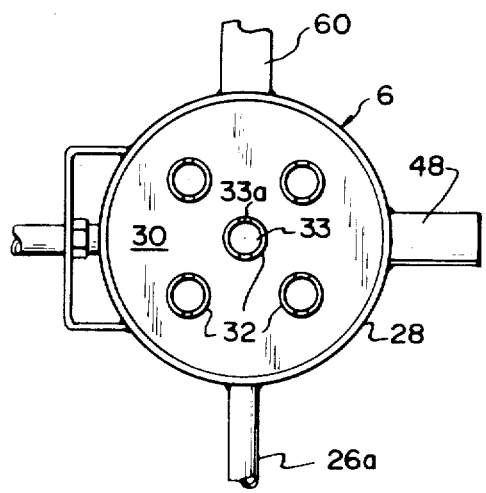
FIG. 3 is a cross-sectional view taken along lines 3—3 of FIG. 2 illustrating the heating element arrangement of the first heating unit in the lower or first heating zone.

The internal construction of boiler 6 is best illustrated in FIGS. 2 and 3. Boiler 6 is shown to consist of a basic cylinder 28, which is preferably fabricated from a corrosion-resistant material, such as stainless steel. A bottom end plate 30, to which a plurality of generally vertically extending hollow cylindrical tubes 32 are welded, is secured adjacent the bottom of the cylinder preferably by welding. The elongated hollow tubes 32 are each designed to accommodate a cartridge type heating element 33 which are retained within tubes 32 in sheathed relationship therewith by bent back tab portions 33a formed adjacent the base of each of the tubes 32. The upper end of each of the elongated tubes 32 is provided with a fluid sealing plug 34. These plugs 34 serve to vertically support and position the boiler ebullience suppressor 36, which is preferably formed from a plurality of stacked fine-mesh screen material sufficient to readily transmit vapor therethrough but which will prevent the transmission of fluid droplets. The area of cylinder 28 contained between the ebullience suppressor 36 and the bottom end plate 30 comprises the lower or first heating zone.

As can be seen from FIGS. 2 and 3, the elongated cartridge heating element sheathing tubes are positioned in a predetermined generally axially extending spaced relationship. One of the tubes is disposed essentially coaxially with respect to the axis of cylinder 28 of the boiler 6, while the remaining four tubes are disposed in radially spaced relationship with respect to the coaxial tube and have their axes disposed tangentially with respect to a circle having the axis of the central tube as its center.

A top end plate 40 is secured transversely in the upper portion of cylinder 28 forming the boiler 6. As can be seen in FIG. 2, a tube or sheath 42 is telescoped through top end plate 40 and secured thereto with a portion projecting above and a substantial portion projecting below the plate. Tube 42 is provided with a hermetically ceiling plug 44 at its innermost end. As in the case of tubes 32, the tube or sheath 42 is designed to accommodate a commonly available cartridge-type heating element 45 which is removably retained within tube 42 by bent back tab portions 45a formed on tube 42 adjacent the uppermost end thereof. A heat conducting fin member 46 is secured to the portion of tube or sheath 42 projecting into the upper or second heating zone of the boiler 6 and in generally spiral relationship with respect thereto.

A temperature tap 48 is provided through cylinder 28 and in communication with the lower or first heating zone of the boiler 6 and a second temperature tap 50 is similarly provided in communication with the second or upper heating zone. Suitable temperature measuring and indicators 49 and 51, respectively, are connected to the temperature taps 48 and 50. A pressure tap 52 is connected to cylinder 28 and in communication with the upper heating zone of the boiler 6. A suitable pressure gauge and indicator 53 is connected to this pressure tap to permit visual comparison of boiler and reservoir pressure.

In applications of the phase heat exchange of the invention wherein there is a likelihood of the development of unusual pressure situations, a pressure relief valve assembly, generally designated 54, is connected to cylinder 28 in communication with the second heating zone of the boiler 6 and is designed to release the pressure therein at a predetermined level.

Referring now to FIG. 1, a fluid outlet 60 is shown to extend from the upper portion of the boiler 6 and is primarily designed to act as a discharge for vapor being produced in the upper or second heating zone of the system. The boiler 6 is provided with a sight glass assembly, generally designated 62 which is similar in material respects to the sight glass assembly 14 used in connection with the fluid-feed reservoir or tank 2. This assembly includes an upper mounting member 64, a lower mounting member 66, a hollow glass tube 68 disposed between the upper and lower members. The hollow tube 68 is placed in communication with the interior of boiler 6 through connecting passages formed in the upper and lower mounting members (not shown).

As shown in FIG. 1, the boiler 6 is supported upon and attached to an electric control box 70. Leads 71 extend from each of the cartridge-type heating elements in both the upper and lower heating zones to separate indicator lights 72 and switches 74 in the electrical control box 70. Each of the circuits in the control box is ordinarily connected to a power input cord which is designed to be preferably connected to commonly available 115 volt, 60 cycles per second, AC power. The circuits can be protected by a 25 AMP circuit breaker or fuse as required. Therefore, when the power cord is plugged into a suitable source of supply, the heating elements in the upper and lower zones of the boiler can be individually and selectively controlled to control the total heat input into the upper and lower zones of the boiler.

In the ordinary operation of the system, a fluid, such as water, is introduced into the reservoir tank 2 and the lid 8 thereof is securely threaded into place. When the desired amount of water has been introduced into the tank, as can be determined by the liquid level in glass tube 20 of the sight glass assembly 14, a pump (not shown) used to pressurize the tank interior through valve 10. During operation of the system, it is desirable to maintain the pressure in tank 2 at about 10 percent to 20 percent above the pressure indicated by boiler pressure gauge 53.

To permit the introduction of water into boiler 6, the manually operable handle of needle valve assembly 24 is turned to the open position. The water level in boiler 6 can be visually determined with reference to the hollow glass tube 68 of sight glass assembly 62 to permit accurate flow control and regulation. When the desired water level in boiler 6 has been achieved, the handle of needle valve assembly 24 can be turned to the "OFF" position to prevent further waterflow from the reservoir or tank 2 until depletion of water in the boiler requires replenishment.

It is now possible to selectively apply heat to the water contained in the boiler. Any or all of the heating element control switches 74 can be opened or closed as desired to control heat input into the system. The five cartridge-type heating elements 33 located in the lower or first zone of the boiler, each having a 500 watt electrical input rating, can be actuated simultaneously to provide a full 2,500 watt electrical input or can be used individually in any combination of 500 watt steps. The cartridge heating element 45 in the upper or dry vapor zone, preferably having a heat input rating of 160 watts, may be turned "on" or "off" as desired. To avert the development of condensation in the upper zone of the boiler 6, the heating element 45 thereof should be maintained in an "on" position.

Therefore, utilizing the system of the invention, an individual can run an almost endless number of various heat transfer tests and experiments. By electrically connecting the system of the invention to a conventional accurately controllable source of electric power output, it is possible to run reasonably accurate experiments involving relatively broad variations of heat input in both the upper and lower heating zones of the boiler. Determinations can be made of resultant steam and dry vapor output by the system as well as pressure variations occurring during various temperature levels produced in the boiler of the system.

For example, the constituent heats contained in a specific quantity of steam generated by the boiler during a predetermined time interval can be determined utilizing the system of the invention. These heats can then be compared with available steam tables. This can be accomplished with the system of the invention by operating the heating elements in the lower or liquid zone of the boiler at full electrical input (2,500 watts). The amount of condensate from wet steam produced in the lower zone of the boiler, passing through the upper zone and out through fluid outlet 60 can be accurately measured using a distillation column (not shown). The mass flow of coolant over this same period in relation to the distillation column is also measured. The temperature gradients of the condensate as well as the coolant can be determined. Utilizing this information, the enthalpy of the steam may be readily determined. The constituent heats of dry or superheated steam can similarly be determined. In this instance, however, the heating element 45 in the upper or dry steam zone of the boiler 6 is energized.

Temperature gradients and heat losses in the boiler of the educational system of the invention can be determined by the application of thermocouples within the boiler. These thermocouples can be applied to the inside of the tubes or sheaths 32 and 42 which contain the removable cartridge-type heating elements 33 and 45, respectively. Thermocouples can be applied to the exterior of these tubes and to the interior wall surface of the cylinder 28 forming the basic boiler 6. This will permit the making of accurate temperature readings to establish gradients between selected points in the boiler.

Partial distillation or fractionation experiments can be conducted with the phase heat exchange apparatus of the invention. These experiments can be conducted to separate mixtures of liquids using the phenomena of partial vapor pressures and differences in the boiling temperatures of components in the mixture. Known or unknown amounts of a fluid, such as ethyl alcohol, can be mixed with water and placed in reservoir or tank 2. A predetermined amount of this liquid mixture can be introduced into boiler 6 by opening valve 24 and permitting fluid passage through conduit 4. The temperature in the boiler is regulated by the electrical input of the heating elements and maintained within the range of the boiling point of ethyl alcohol, as determined by available tables, or if it is preferred to establish this boiling temperature, the electrical input of the heating elements can be adjusted to the point where the first condensate appears. Since the evaporation of water takes place at the temperature where this condensate appears, the condensate will contain a mixture of water plus alcohol. The enthalpy of the alcohol can be derived from the total enthalpy of the mixture as measured in the condensate, diminished by the enthalpy of the water content as taken from steam tables or as determined in a previous experiment.

The above merely sets forth a few possible experiments which can be conducted by an individual student to make numerous determinations involving heat input and heat transfer. Many additional experiments can be produced.

Various modes of carrying out the invention are contemplated as being within the scope of the following claims particularly pointing out and distinctly claiming the subject matter which is regarded as the invention.

I claim:

1. A portable educational apparatus for visually demonstrating the results obtained by applying heat to a fluid being studied comprising
   a boiler unit for applying heat to a fluid to be studied,
   said boiler unit having dividing means forming a first fluid heating zone and a second fluid heating zone,
   said dividing means allowing passage of vapor from said first heating zone to said second heating zone and preventing passage of liquid therebetween,
   a reservoir means for receiving a quantity of the fluid to be studied,
   conduit means for establishing fluid communication between the reservoir means and the boiler unit,
   fluid flow control means operatively connected to the conduit means for selectively dispensing fluid from the quantity of fluid in the reservoir means to the boiler for study thereof,
   first heating means disposed in thermal communication with said first fluid heating zone,
   second heating means disposed in thermal communication with second fluid heating zone,
   discharge means for discharging vapor from the boiler unit as required,
   indicator means coupled to the first and second heating zones for indicating a condition of the fluid therein, and
   portable frame means to unitarily support the boiler unit and the reservoir in a position for visual observation during the application of heat to the fluid to be studied.

2. The educational apparatus of claim 1 further including a first indicator means for indicating a condition of the fluid in the first fluid heating zone and a second indicator means for indicating a condition of the fluid in the second fluid heating zone.

3. The educational apparatus of claim 1 wherein pressurizing means are provided for pressurizing the reservoir means in a manner maintaining the reservoir means at a higher pressure than that of the boiler unit.

4. The educational apparatus of claim 3 wherein pressure indicator means are provided on the reservoir means and on the boiler unit to provide for the visual comparison of the fluid pressures existing in the boiler unit and in the reservoir means at a given moment.

5. The educational apparatus of claim 4 wherein fin means are provided on the second heating element in the second fluid heating zone for increasing dissipation of heat in the heating zone.

6. The educational apparatus of claim 5 wherein the fin means are connected to the second heating element means in a spiral relationship thereto.

7. The educational apparatus of claim 1 wherein said dividing means includes an ebullience suppressor member.

8. The educational apparatus of claim 1 wherein pressure relief means is connected in communication with one of said fluid heating zones to effect a release of pressure when it exceeds a predetermined level.

9. A portable educational apparatus for visually demonstrating the results obtained by applying heat to a fluid being studied comprising
   a boiler unit for applying heat to a fluid to be tested,
   means for providing controlled fluid feed to the boiler unit,
   the boiler unit having dividing means forming a first fluid heating zone and means forming a second fluid heating zone,
   said dividing means allowing passage of vapor from said first heating zone to said second heating zone and preventing passage of liquid therebetween, first heating element means disposed in communication with said first fluid heating zone, second heating element means disposed in communication with said second fluid heating zone, heat control means for individually controlling the operation of the first and second heating elements, a reservoir means for receiving a quantity of the fluid to be studied, conduit means for establishing fluid communication between the reservoir means and the boiler unit, fluid flow control means operatively connected to the conduit means for selectively dispensing fluid from the quantity of fluid in the reservoir means to the boiler for study thereof, first indicator means for indicating a condition of the fluid in the first fluid heating zone, second indicator means for indicating a condition of the fluid in the second fluid heating zone, discharge means for discharging vapor from the boiler unit as required, the first heating element means includes a plurality of heat input members, control means are provided for individually controlling the heat input members and portable frame means to unitarily support the boiler unit and the reservoir in a position for visual observation during the application of heat to the fluid to be studied.

* * * * *